June 23, 1925.
F. H. ALEXANDER ET AL
1,542,809
INCLINOMETER
Filed Dec. 1, 1922
2 Sheets-Sheet 1
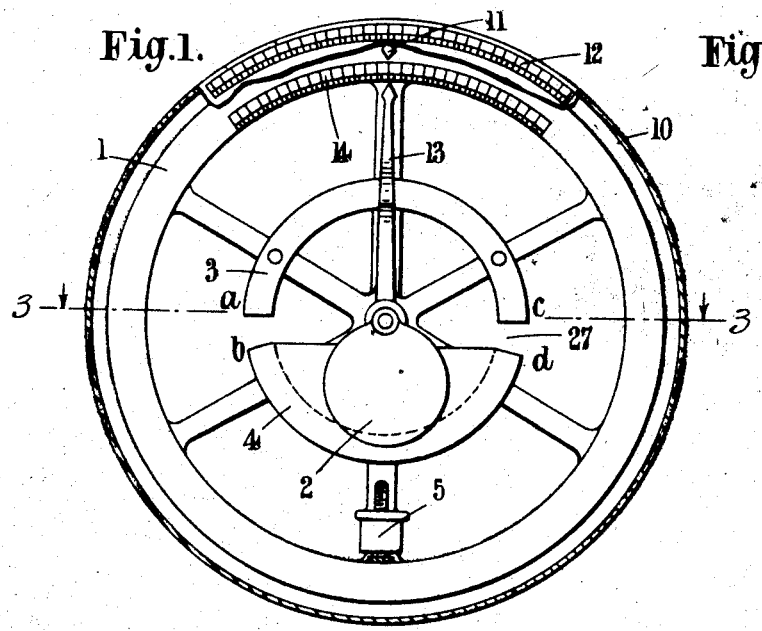
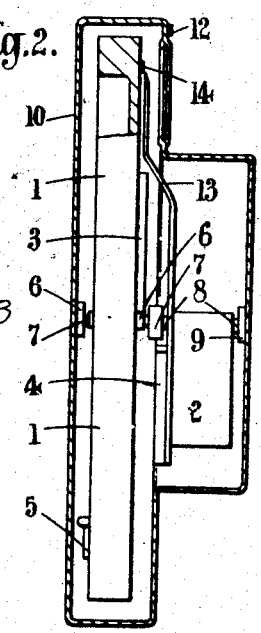
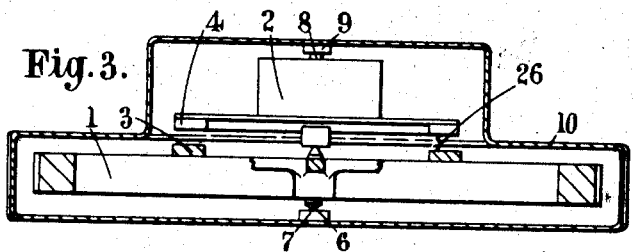
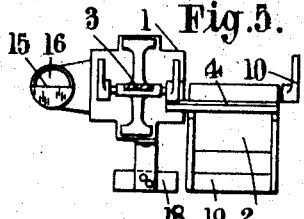
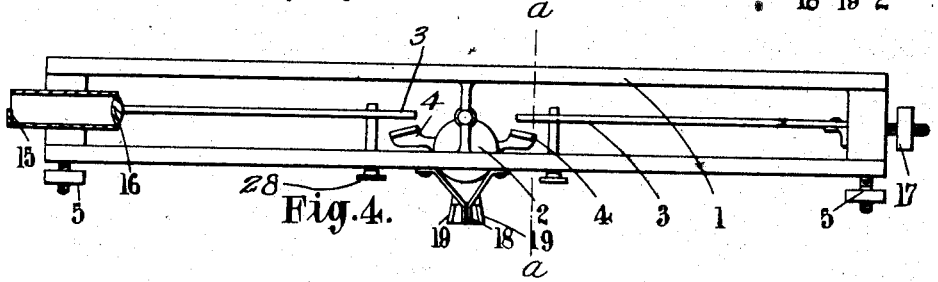
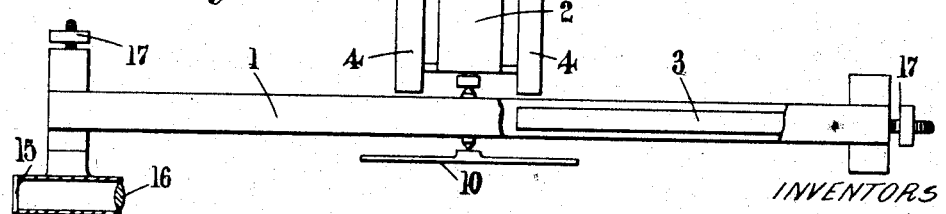
INVENTORS
Francis Herbert Alexander
John Wilson Gillie
By Otto Ulinik
their Attorney.

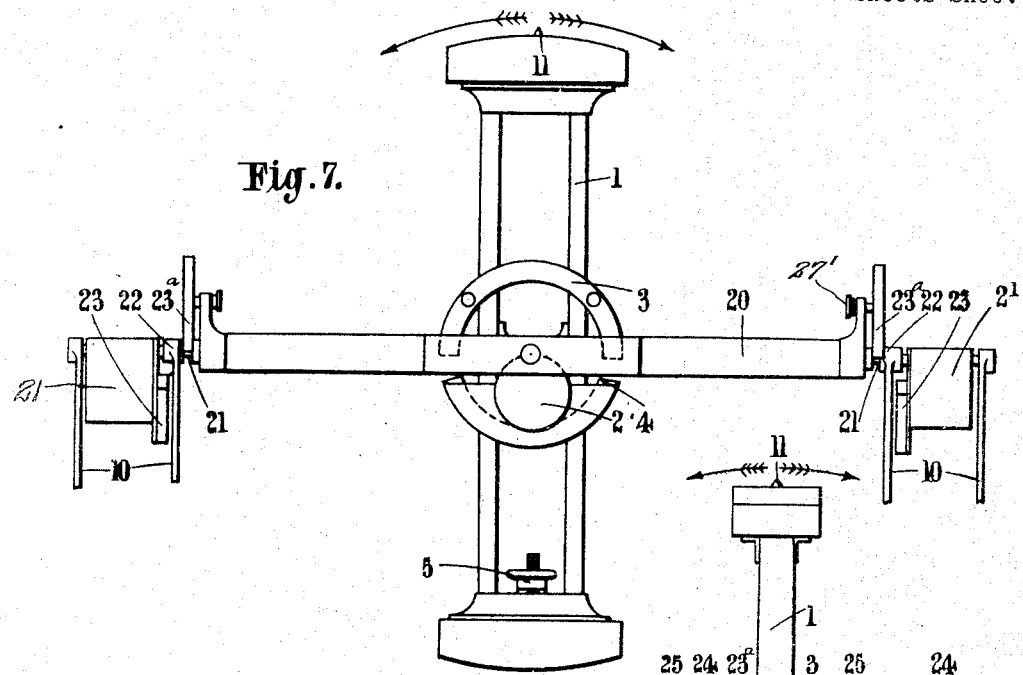
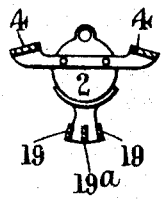
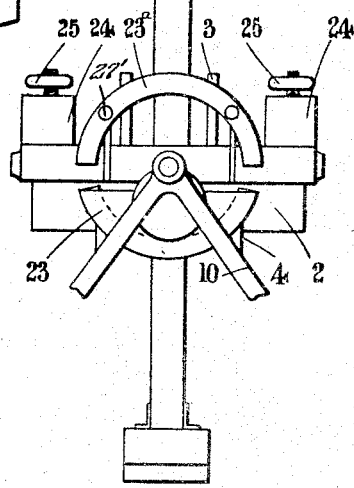
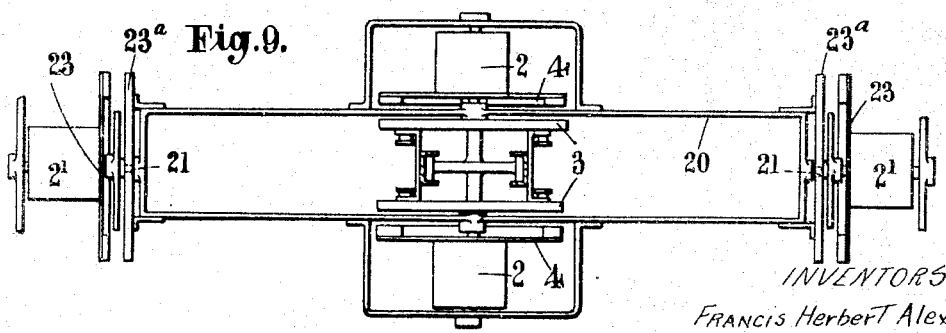

Patented June 23, 1925.

1,542,809

UNITED STATES PATENT OFFICE.

FRANCIS HERBERT ALEXANDER, OF NEWCASTLE-ON-TYNE, AND JOHN WILSON GILLIE, OF NORTH SHIELDS, ENGLAND.

INCLINOMETER.

Application filed December 1, 1922. Serial No. 604,199.

*To all whom it may concern:*

Be it known that we, FRANCIS HERBERT ALEXANDER, residing at 34 Burdon Terrace, Jesmond, Newcastle-on-Tyne, England, and JOHN WILSON GILLIE, of The New Quay, North Shields, England, both subjects of His Majesty the King of Great Britain, have invented certain new and useful Improvements in or Relating to Inclinometers, of which the following is a specification, reference being had therein to the accompanying drawing.

This invention relates to inclinometers and other instruments in which it is desired to indicate continuously a fixed direction, such as the vertical, notwithstanding disturbing accelerations, and has for its primary object to use magnetic means to cause a pendulum of short period to oppose the deflection of a pendulum of relatively long period when subjected to acceleration, so that an accurate determination of the said fixed direction may be obtained under disturbing accelerations.

According to this invention a pendulum of relatively long period mounted upon the frame of the instrument is used to indicate a desired direction, such as the vertical, and a co-axial pendulum of short period is provided with a magnet placed in relation with another magnet or armature upon the long period pendulum, to form a magnetic coupling between the two pendulums, the moment of which increases according to the amount of relative deflection between the two pendulums. Or, obviously, the said magnetic coupling may be formed by a magnet on the long period pendulum and an armature on the short period pendulum.

The means for forming the said magnetic coupling may be so arranged and the magnet or magnets of such strength that the turning couple produced by a deflection of the short period pendulum, due to an acceleration, counterbalances the turning couple on the long period pendulum produced by said acceleration.

The magnets, or the magnet and armature, may be attached to their respective pendulums so that the clearances between their poles may be adjusted in order that the magnetic couple may be varied.

Small additional subsidiary magnet systems may be provided to cause alternate excess and reduction in the magnetic couple as the short period pendulum deviates more and more from the normal.

The short period pendulum may also carry a subsidiary magnet placed so as to assist in centralizing the long period pendulum against any frictional effect of the bearings.

Means may be provided for adjusting the periods of one or both of the pendulums.

A combined datum line and collimating lens may be attached to the long period pendulum when necessary, as for example when the pendulum is used for the purpose of providing an artificial horizon or similar datum plane.

The long period pendulum may be supported in gimbals so as to move in two planes at right angles to each other, the said pendulum being provided with a system of magnets and co-operating short period pendulums for each of the two directions of motion.

It is to be understood that the long period pendulum may be of any suitable kind or construction, for example, a pendulum of the Mallock type, which oscillates in fluid may be employed.

Examples of construction according to the invention are illustrated in the annexed drawings which are more or less diagrammatic in character and in which:—

Fig. 1 is a front elevation of an inclinometer with most of the case shown in section.

Fig. 2 is a part sectional side elevation of Fig. 1 with the case in section.

Fig. 3 is a sectional plan of Fig. 1 along a line 3—3 just above the axis.

Fig. 4 is an elevation of a modification.

Fig. 4ª shows a detail.

Fig. 5 is a cross section on the line a—a of Fig. 4.

Fig. 6 is a plan of Fig. 4.

Fig. 7 is a front elevation of another modification.

Fig. 8 is an end elevation of Fig. 7.

Fig. 9 is a plan of Fig. 7.

Referring to Figs. 1 to 3 inclusive, which illustrates a simple form of inclinometer, a long period pendulum 1 is mounted on an axis 6 in bearings 7, and a short period pendulum 2 is mounted on an axis 8 in bearings 9 co-axial with the axis 6. A magnet 3 is attached to the long period pendulum 1, and a magnet 4 to the short period pendulum 2, so that their opposite poles *a*, *b*, and *c*, *d* are equidistant and opposite one another in the normal position. The pendulum 1 is provided with a datum point 11, and the pendulum 2 is provided with a pointer 13 adapted to travel over the scale 14 which is upon pendulum 1.

The apparatus is mounted in a case 10 which is provided with a scale 12 in proximity to the path of the datum point 11, to show the inclination of the case. A glazed opening in the case 10 permits 11, 13 and 14 to be seen.

The magnet 4 is not in the same plane as the magnet 3 to permit a transverse clearance 26 between them. There are also radial clearances 27 between the opposed poles of the magnets. The magnitude of these clearances may be varied or adjusted by suitable means to vary the magnitude of the magnetic torque.

The pendulum 1 is provided with an adjustable sliding weight 5 to permit the period to be varied.

When a disturbing acceleration (say towards the right hand in Fig. 1) is present at the axis of suspension, the pendulum 2 deviates towards the left more rapidly than the pendulum 1. The resulting change in the relative positions of the two pendulums brings the poles *a*, *b* closer together and moves the poles *c*, *d* further apart. The attraction between *a* and *b* is therefore increased and between *c*, *d* diminished. There is therefore a resultant turning couple produced which affects both pendulums, tending to decrease the deviation of pendulum 1 and to increase that of pendulum 2. The amount of acceleration force on pendulum 1 is small and can be counterbalanced by the magnetic moment. The moment of the acceleration force on the pendulum 2 is relatively large so that the increase of moment due to the magnetic moment is negligibly small.

By suitably adjusting the clearances 26, 27 to the strength of the magnets and by adjusting the period of the pendulum 1, the magnitudes of the moments due to acceleration and to the magnetic attraction substantially counteracts each other on the pendulum 1 over a considerable range of deviation of the pendulum 2, so that the deviation of the pendulum 1 is made small for a considerable range of variation in the magnitude of acceleration.

Thus the inclination of the case is shown by means of the datum mark 11 and scale 12. The magnitude of the disturbing acceleration is shown by means of the pointer 13 and scale 14.

In the modification shown in Figs. 4 to 6 inclusive, the long period pendulum 1 is arranged as a horizontal unit having adjustable balancing weights 5, 17 and bar magnets 3, and pivoted on a frame 10. The short period pendulum 2 is pivoted to the frame 10 co-axial with the pendulum 1 and is provided with magnets 4 co-operating with the magnets 3.

A datum line 15 combined with a collimating lens 16 is attached to the pendulum 1 so that 15 may be seen through 16 when the instrument is used, for example, to provide an artificial horizon or similar datum plane.

The pendulum 1 may be provided with a subsidiary magnet 18 and the pendulum 2 with subsidiary magnets 19 adapted to co-operate with the magnet 18 to cause alternate excess and reduction in the magnetic couple as the pendulum 2 deviates more and more from the normal. The pendulum 2 may also be provided with the subsidiary magnet $19^a$ (see Fig. $4^a$) adapted to co-operate with the magnet 18 for the purpose of assisting in centralizing the pendulum 1 against any frictional effect of the bearings.

In the modification shown in Figs. 7 to 9 inclusive, the pendulums 1 and 2 provided with the magnets 3 and 4 are pivoted in a frame 20 which latter is provided with pivots 21 at right angles to the axes of the pendulums 1 and 2, so as to act as gimbals to allow the long period pendulum 1 two motions respectively at right angles to one another. The pivots 21 are mounted in bearings 22 on a fixed frame or case 10. Co-operating magnets 23, 23 are mounted on the frame 20 and on secondary short period pendulums 2' respectively. The pendulums 2' oscillate in planes at right angles to the planes of oscillation of the pendulum 2.

The frame 20 is counterbalanced by weights 24 adjusted by screws 25. These weights 24 and screws 25 are omitted from Figs. 7 and 9 for the sake of clearness.

In Fig. 4 adjusting screw 28 enables pole of magnet 3 to be varied as regards its angular or circumferential distance from that of magnet 4. In Fig. 7 adjusting screw 27' enables poles of magnet $23^a$ to be varied as regards their transverse clearance from those of 23, which rotates in a plane parallel to that of $23^a$.

By the above described construction the long period pendulum 1 may be compensated for disturbance by acceleration in two directions at right angles.

What we claim and desire to secure by Letters Patent of the United States is:—

1. An instrument of the character described, comprising in combination a pendulum of relatively long period, a pendulum of short period, and means between the two pendulums for forming a magnetic coupling to oppose the deflection of the long period pendulum when subjected to acceleration.

2. An instrument of the character described, comprising a frame for said instrument, a pendulum of relatively long period mounted in said frame of the instrument, to indicate a desired direction, such as vertical, a pendulum of short period mounted co-axially with said first pendulum, and means for forming a magnetic coupling between the two pendulums comprising a magnet for one of the pendulums disposed in cooperative relation with a magnet upon the other pendulum, the resultant moment of said coupling being increased substantially in direct proportion to the amount of relative deflection between the two pendulums.

3. An instrument, as claimed in claim 2, in which the magnets attached to the two pendulums are disposed to swing in parallel planes having a desired clearance therebetween.

4. An instrument, as claimed in claim 2, in which the magnets attached to the two pendulums are disposed to swing in parallel planes, having a desired clearance therebetween and means to adjust the relative positions of the magnets whereby the clearance between the elements may be varied to change the magnetic couple.

5. An instrument, as claimed in claim 2, including means forming a datum line attached to the long period pendulum, and a collimating lens carried by the latter, whereby the said line may be observed through the lens as for example when used as an artificial horizon.

6. An instrument as claimed in claim 2, in which the frame for the long-period pendulum comprises a supporting gimbal to enable free movement of said pendulum in two planes at right angles one to the other, short-period pendulums associated with said gimbal, and magnets carried by said gimbal and its associated pendulums, respectively, said magnets being adapted to cooperate to oppose deflection of said gimbal in a plane normal to the plane of oscillation of said long-period pendulum.

In testimony whereof we have hereunto signed our names in the presence of two subscribing witnesses.

FRANCIS HERBERT ALEXANDER.
JOHN WILSON GILLIE.

Witnesses:
   H. F. RENNOLDSON,
   A. HILLARY.